(12) United States Patent
Wang et al.

(10) Patent No.: US 10,208,696 B2
(45) Date of Patent: Feb. 19, 2019

(54) MULTIVARIABLE ENGINE TORQUE AND EMISSION CLOSED-LOOP CONTROL FOR INTERNAL COMBUSTION ENGINE

(71) Applicant: GM GLOBAL TECHNOLOGY OPERATIONS LLC, Detroit, MI (US)

(72) Inventors: Yue-Yun Wang, Troy, MI (US); Ibrahim Haskara, Pontiac, MI (US); Chen-fang Chang, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 274 days.

(21) Appl. No.: 15/299,635

(22) Filed: Oct. 21, 2016

(65) Prior Publication Data

US 2018/0112616 A1 Apr. 26, 2018

(51) Int. Cl.
*F01N 3/20* (2006.01)
*F02D 41/26* (2006.01)
(Continued)

(52) U.S. Cl.
CPC ........... *F02D 41/26* (2013.01); *F01N 13/008* (2013.01); *F02D 41/0007* (2013.01); *F02D 41/0077* (2013.01); *F02D 41/1406* (2013.01); *F02D 41/1461* (2013.01); *F02D 41/401* (2013.01); *F02D 43/04* (2013.01); *F02M 26/02* (2016.02); *F01N 3/2066* (2013.01); *F01N 2560/026* (2013.01); *F02D 2041/001* (2013.01); *F02D 2041/002* (2013.01);
(Continued)

(58) Field of Classification Search
CPC ............. F02D 41/0007; F02D 41/0077; F02D 41/1406; F02D 41/26; F02D 2200/08; F02D 2200/1002; F02D 2200/101; F02D 2041/002; F02D 43/04; F01N 13/008; F01N 3/2066; F01N 2560/026; F02M 26/02
USPC .................... 60/286, 287, 295; 701/108–109
See application file for complete search history.

(56) References Cited

U.S. PATENT DOCUMENTS

7,810,476 B2 10/2010 Wang et al.
8,091,416 B2 1/2012 Wang et al.
(Continued)

*Primary Examiner* — Thai Ba Trieu
*Assistant Examiner* — Dapinder Singh
(74) *Attorney, Agent, or Firm* — Quinn IP Law (57) ABSTRACT

Disclosed are engine torque and emission control (ETEC) systems, methods for using such systems, and motor vehicles with engines employing ETEC schemes. An ETEC system is disclosed for operating an internal combustion engine (ICE) assembly. The system includes an engine sensor for monitoring engine torque, an exhaust sensor for monitoring nitrogen oxide (NOx) output of the ICE assembly, and an engine control unit (ECU) communicatively connected to the engine sensor, exhaust sensor, and ICE assembly. The ECU is programmed to: receive desired engine torque and desired NOx output data; determine, from current engine torque and current NOx output data, desired engine torque, and desired NOx output, desired engine operation and exhaust operation references; determine, from the desired engine operation and exhaust operation references, an engine operation control command and an exhaust operation control command; and regulate operation of the ICE assembly via the engine operation and exhaust operation control commands.

20 Claims, 3 Drawing Sheets

(51) Int. Cl.
*F02D 43/04* (2006.01)
*F02D 41/14* (2006.01)
*F02M 26/02* (2016.01)
*F01N 13/00* (2010.01)
*F02D 41/00* (2006.01)
*F02D 41/40* (2006.01)

(52) U.S. Cl.
CPC .. *F02D 2041/0017* (2013.01); *F02D 2200/08* (2013.01); *F02D 2200/101* (2013.01); *F02D 2200/1002* (2013.01); *F02D 2250/18* (2013.01)

(56) References Cited

U.S. PATENT DOCUMENTS

| | | |
|---|---|---|
| 8,201,444 B2 | 6/2012 | Wang et al. |
| 8,276,373 B2 | 10/2012 | Wang et al. |
| 8,392,091 B2 | 3/2013 | Hebbale et al. |
| 8,612,119 B2 | 12/2013 | Wang et al. |
| 8,694,197 B2 | 4/2014 | Rajagopalan et al. |
| 8,942,912 B2 * | 1/2015 | Wang ................. F02D 41/1462 701/109 |
| 8,973,431 B2 * | 3/2015 | Nagaoka ............ F01N 13/0097 73/114.69 |
| 9,133,750 B2 | 9/2015 | Levijoki et al. |
| 2008/0051973 A1 | 2/2008 | Gangopadhyay et al. |
| 2009/0272102 A1 * | 11/2009 | Ofoli .................... F01N 13/009 60/286 |
| 2012/0085082 A1 | 4/2012 | Levijoki et al. |
| 2012/0286063 A1 | 11/2012 | Wang et al. |

* cited by examiner

MULTIVARIABLE ENGINE TORQUE AND EMISSION CLOSED-LOOP CONTROL FOR INTERNAL COMBUSTION ENGINE

INTRODUCTION

The present disclosure relates generally to exhaust aftertreatment systems for regulating engine emissions. More specifically, aspects of this disclosure relate to predictive control strategies of aftertreatment NOx reduction for internal combustion engine assemblies.

Current production motor vehicles, such as the modern-day automobile, are originally equipped with a powertrain that operates to propel the vehicle and power the onboard vehicle electronics. The powertrain, which is inclusive of and oftentimes misclassified as a drivetrain, is generally comprised of a prime mover that delivers driving power to the vehicle's final drive system (e.g., rear differential, axle, and wheels) through a multi-speed power transmission. Automobiles have generally been powered by a reciprocating-piston type internal combustion engine (ICE) because of its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid vehicles, on the other hand, utilize alternative power sources, such as battery powered electric motor-generators, to propel the vehicle, minimizing reliance on the engine for power and, thus, increasing overall fuel economy.

A typical overhead valve internal combustion engine includes an engine block with a series of cylinder bores, each of which has a piston reciprocally movable therein. Coupled to a top surface of the engine block is a cylinder head that cooperates with the piston and cylinder bore to form a variable-volume combustion chamber. These reciprocating pistons are used to convert pressure—generated by igniting a fuel-and-air mixture in the combustion chamber—into rotational forces to drive a crankshaft. The cylinder head defines intake ports through which air, provided by an intake manifold, is selectively introduced to each combustion chamber. Also defined in the cylinder head are exhaust ports through which exhaust gases and byproducts of combustion are selectively evacuated from the combustion chambers to an exhaust manifold. The exhaust manifold, in turn, collects and combines exhaust gases for recirculation into the intake manifold, delivery to a turbine-driven turbocharger, and/or evacuation from the ICE via an exhaust system.

Exhaust gases produced during each combustion work cycle of an ICE assembly normally includes particulate matter and other known by-products of combustion, such as carbon monoxide (CO), hydrocarbons (HC), volatile organic compounds (VOCs), and nitrogen oxides (NOx). Exhaust aftertreatment systems operate to oxidize unburned hydrocarbons and carbon monoxide to carbon dioxide and water, and to reduce mixtures of nitrogen oxides to nitrogen and water before the gas is released into the atmosphere. Exhaust treatment may incorporate, singly and in any combination, an oxidation catalyst (OC), NOx absorbers/adsorbers, exhaust gas recirculation (EGR), a selective catalytic reduction (SCR) system, a particulate matter (PM) filter, catalytic converters and other means of emissions control. Selective catalytic reduction is an advanced active emissions control technology that injects a dosing agent, such as anhydrous or aqueous ammonia (NH3) or automotive-grade urea (otherwise known as Diesel Exhaust Fluid (DEF)), into the exhaust gas stream. This dosing agent includes a reductant that reacts and mixes with the NOx in the exhaust gas, and the mixture may be absorbed onto an SCR catalyst. The SCR catalyst may then break down the absorbed mixture forming water vapor (H2O) and nitrogen gas (N2).

SUMMARY

Disclosed herein are multivariable engine torque and emission control systems for internal combustion engine (ICE) assemblies, methods for making and methods for using such control systems, and motor vehicles with an ICE assembly and exhaust aftertreatment system having closed-loop torque and emission control capabilities. By way of example, and not limitation, there is presented a novel multivariable engine torque and emission closed-loop control strategy and architecture with real-time torque and emission sensor feedback to deliver torque and closed-loop based air and combustion control to minimize emissions. In some examples, the control design is based on an engine torque and engine out NOx model, as well as an engine air path model. Embodied, for example, as a Model Predictive Control (MPC) algorithm composed of processor-executable instructions effectuated by an onboard engine control unit of an automobile, the MPC strategy controls multi-input and multi-output combustion systems using, for example, turbocharger wastegate (WG), or variable geometry turbocharger (VGT) position, intake throttle valve (ITV), start of injection (SOI) (or spark timing (Spk)), and cam phaser (CP) data with constraint fuel economy optimization, such that the engine may achieve high torque tracking performance while improving combustion efficiency and reducing NOx, PM, and HC emissions. Torque data can be provided via a torque sensor installed engine-side or a model with estimated engine torque. Aftertreatment system data can be provided via an engine out NOx sensor at the selective catalytic reduction (SCR) inlet.

Attendant benefits for at least some of the disclosed embodiments include the ability to optimize combustion efficiency while concomitantly providing fast torque response tracking and minimizing fuel consumption. Other potential benefits include providing real-time NOx feedback control to provide optimal integration of combustion and aftertreatment systems to gain more fuel economy during aftertreatment NOx reduction. Disclosed systems, methods and devices also help to reduce air-charging system calibration time and associated costs. Disclosed algorithms and architectures may be operable to apply closed-loop torque and emission control using real-time torque sensor or stored model data, as well as real-time NOx out sensor data. Disclosed algorithms and architectures may be extended to include real-time particulate sensor feedback control.

Aspects of the present disclosure are directed to multivariable engine torque and emission closed-loop control systems for reciprocating-piston type internal combustion engine assemblies with EGR and SCR functionality. Disclosed, for example, is an engine torque and emission control (ETEC) system for an ICE assembly, which is fabricated with multiple variable-volume combustion chambers fluidly coupled to an exhaust aftertreatment system. The ETEC system includes an engine sensor that detects a current engine torque of the ICE assembly, and outputs one or more signals indicative thereof, and an exhaust sensor that detects a current nitrogen oxide (NOx) output of the ICE assembly, and outputs one or more signals indicative thereof. The ETEC system also includes a programmable engine control unit that is communicatively connected to the engine sensor, exhaust sensor, and ICE assembly. This engine control unit is configured to: receive indications of a desired engine torque and a desired NOx output; determine, from the current engine torque, current NOx output, desired engine torque, and desired NOx output, a desired engine operation reference and a desired exhaust operation reference; determine, from the desired engine operation reference and the desired exhaust operation reference, an engine operation control command and an exhaust operation control command; and output the engine operation and exhaust operation control commands to the ICE assembly.

In the foregoing example, the desired engine operation reference may include: a desired engine boost pressure reference, a desired engine intake manifold pressure (MAP) reference, a desired variable valve actuation (VVA) reference, and/or a desired start of injection (SOI) reference. Likewise, the desired exhaust operation reference may include a desired exhaust gas recirculation (EGR) reference. In the same vein, the engine operation command may include: a turbocharger wastegate (WG) command, a throttle (Thr) command, a turbine nozzle command, and/or a variable valve actuation (VVA) command. The exhaust operation control command may include an exhaust gas recirculation (EGR) valve command and/or a selective catalytic reduction (SCR) reductant injection command.

Other aspects of the present disclosure are directed to motor vehicles with reciprocating-piston-type engine assemblies with multivariable engine torque and emission closed-loop control capabilities. A "motor vehicle," as used herein, may include any relevant vehicle platform, such as passenger vehicles (internal combustion engine, hybrid, fuel cell, fully or partially autonomous, etc.), commercial vehicles, industrial vehicles, tracked vehicles, off-road and all-terrain vehicles (ATV), farm equipment, boats, airplanes, etc. In an example, a motor vehicle is presented that includes a vehicle body with an engine compartment, and an internal combustion engine (ICE) assembly stowed, wholly or partially, inside the engine compartment. The ICE assembly includes an engine block with a series of cylinder bores, and a piston reciprocally movable within each one of the cylinder bores. An exhaust gar recirculation (EGR) system is fluidly coupled to the ICE assembly and configured to recirculate exhaust gases from the ICE assembly back into one or more of the cylinder bores.

Continuing with the above example, the motor vehicle also includes one or more engine sensors for monitoring, in real-time, the ICE assembly's current engine torque, as well as one or more exhaust sensors for monitoring, in real-time, the ICE assembly's current NOx output. A programmable engine control unit is communicatively connected to the ICE assembly, the exhaust sensor(s), and the engine sensor(s). This engine control unit is programmed to: receive signals indicative of current engine torque, current NOx output, desired engine torque and desired NOx output; determine, from the current engine torque and NOx output, and the desired engine torque and NOx output, one or more desired engine operation references and one or more desired exhaust operation references; determine, from the desired engine operation reference and exhaust operation references, one or more engine operation control commands and one or more exhaust operation control commands; and, regulate operation of the ICE assembly and EGR system based on the engine operation and exhaust operation control commands.

Additional aspects of this disclosure are directed to methods of making and methods of using multivariable engine torque and emission closed-loop control systems for reciprocating-piston type internal combustion engine assemblies with EGR and SCR functionality. For instance, a method is disclosed for operating an engine torque and emission control system for an ICE assembly. The method includes, in any order and in any combination: receiving indications of a desired engine torque and a desired NOx output; receiving, from an engine sensor mounted to a component of the engine, a current engine torque of the ICE assembly; receiving, from an exhaust sensor mounted to a component of the exhaust aftertreatment system, a current NOx output of the ICE assembly; determining, from the current engine torque, current NOx output, desired engine torque, and desired NOx output, a desired engine operation reference and a desired exhaust operation reference; determining, from the desired engine operation reference and desired exhaust operation reference, an engine operation control command and an exhaust operation control command; and, transmitting the engine operation and exhaust operation control commands to the ICE assembly.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Figure 1:
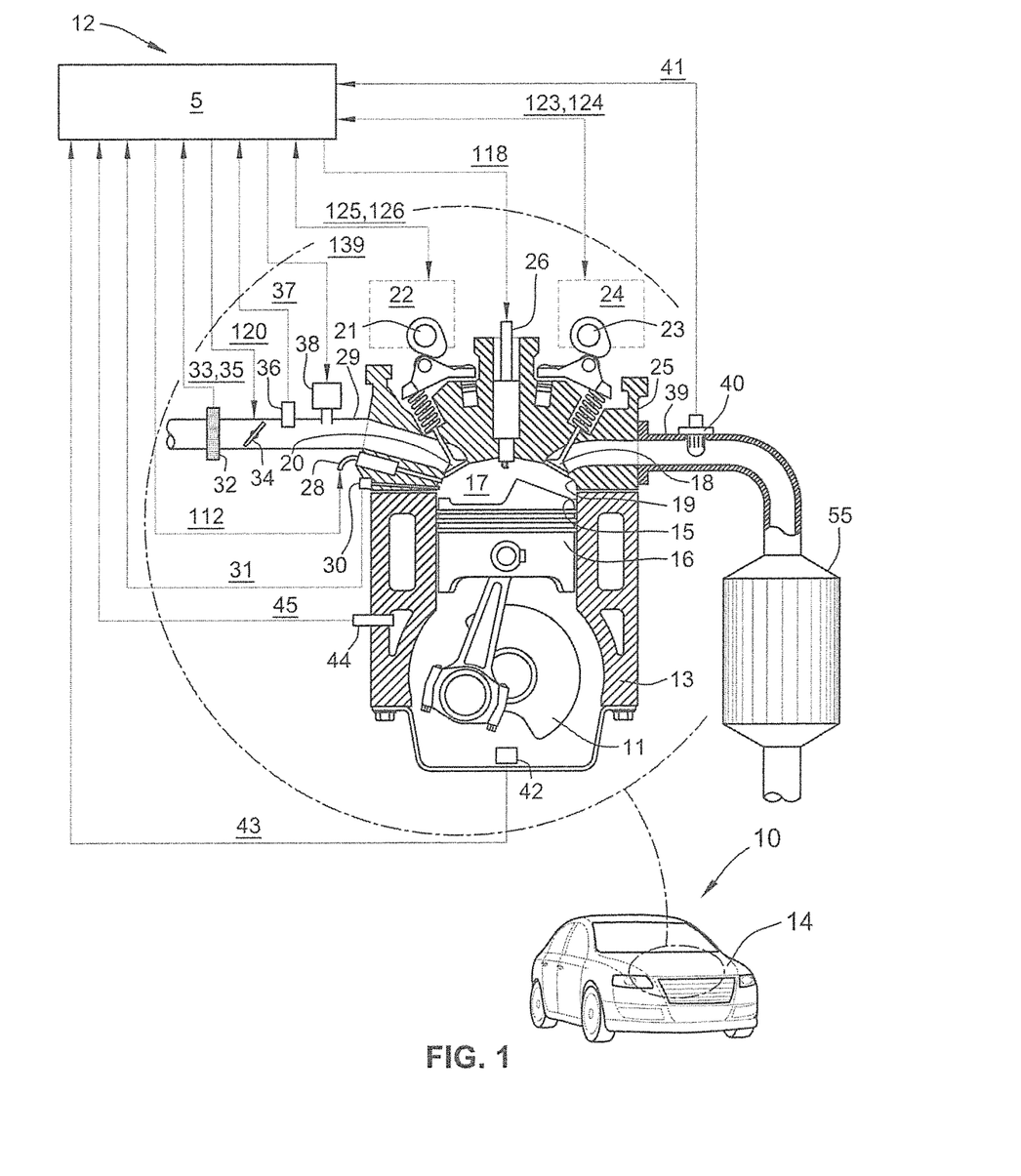
FIG. 1 is a front perspective-view illustration of a representative motor vehicle with an inset schematic illustration of a representative spark-ignited reciprocating-piston type internal combustion engine (ICE) assembly with multivariable torque and emission closed-loop control capabilities in accordance with aspects of the present disclosure.

Referring now to the drawings, wherein like reference numbers refer to like features throughout the several views, there is shown in FIG. 1 a perspective-view illustration of a representative automobile, which is designated generally at 10 and portrayed herein for purposes of discussion as a four-door sedan-style passenger vehicle. Mounted at a forward portion of the automobile 10, e.g., aft of a front bumper fascia and grille and forward of a passenger compartment, is an internal combustion engine (ICE) assembly 12 housed within an engine compartment covered by an engine hood 14. The illustrated automobile 10—also referred to herein as "motor vehicle" or "vehicle" for short—is merely an exemplary application with which the novel aspects and features of this disclosure may be practiced. In the same vein, the implementation of the present concepts into a spark ignited direct injection (SIDI) engine configuration should also be appreciated as an exemplary application of the novel concepts disclosed herein. As such, it will be understood that the aspects and features of the present disclosure may be applied to other engine architectures, implemented for other exhaust aftertreatment systems, and utilized for any logically relevant type of motor vehicle. Lastly, the drawings presented herein are not necessarily to scale and are provided purely for instructional purposes. Thus, the specific and relative dimensions shown in the drawings are not to be construed as limiting.

There is shown in FIG. 1 an example of a multi-cylinder, dual overhead cam (DOHC), inline-type ICE assembly 12. The illustrated ICE assembly 12 is a four-stroke reciprocating-piston engine configuration that operates to propel the vehicle 10, for example, as a direct injection gasoline engine, including flexible-fuel vehicle (FFV) and hybrid vehicle variations thereof. The ICE assembly 12 may optionally operate in any of an assortment of selectable combustion modes, including a homogeneous-charge compression-ignition (HCCI) combustion mode and other compression-ignition (CI) combustion modes. Additionally, the ICE assembly 12 may operate at a stoichiometric air/fuel ratio and/or at an air/fuel ratio that is primarily lean of stoichiometry. This engine 12 includes a series of reciprocating pistons 16 slidably movable in cylinder bores 15 of an engine block 13. The top surface of each piston 16 cooperates with the inner periphery of its corresponding cylinder 15 and a recessed chamber surface 19 of a cylinder head 25 to define a variable volume combustion chambers 17. Each piston 16 is connected to a rotating crankshaft 11 by which linear reciprocating motion of the pistons 16 is output, for example, to a power transmission (not shown) as rotational motion via the crankshaft 11.

An air intake system transmits intake air to the cylinders 15 through an intake manifold 29, which directs and distributes air into the combustion chambers 17 via intake runners of the cylinder head 25. The engine's air intake system has airflow ductwork and various electronic devices for monitoring and controlling the air flow. The air intake devices may include, as a non-limiting example, a mass airflow sensor 32 for monitoring mass airflow (MAF) 33 and intake air temperature (IAT) 35. A throttle valve 34 controls airflow to the ICE assembly 12 in response to a control signal (ETC) 120 from a programmable engine control unit (ECU) 5. A pressure sensor 36 in the intake manifold 29 monitors, for instance, manifold absolute pressure (MAP) 37 and barometric pressure. An external flow passage recirculates exhaust gases from engine exhaust to the intake manifold 29 and, thus, back into the cylinder bores 15, e.g., via a control valve in the nature of an exhaust gas recirculation (EGR) valve 38 of an EGR system. The programmable engine control unit 5 controls mass flow of exhaust gas to the intake manifold 29 through the EGR system by controlling opening of the EGR valve 38 via EGR command 139. In FIG. 1, the arrows connecting ECU 5 with the various components of the ICE assembly 12 are emblematic of electronic signals or other communication exchanges by which data and/or control commands are transmitted from one component to the other.

Airflow from the intake manifold 29 into each combustion chamber 17 is controlled by one or more dedicated intake engine valves 20. Evacuation of exhaust gases out of the combustion chamber 17 to an exhaust aftertreatment system 55 via an exhaust manifold 39 is controlled by one or more dedicated exhaust engine valves 18. In accord with at least some of the disclosed embodiment, exhaust aftertreatment system 55 includes an exhaust gas recirculation (EGR) system and/or a selective catalytic reduction (SCR) system. The engine valves 18, 20 are illustrated herein as spring-biased poppet valves; however, other known types of engine valves may be employed. The ICE assembly 12 valve train system is equipped to control and adjust the opening and closing of the intake and exhaust valves 20, 18. According to one example, the activation of the intake and exhaust valves 20, 18 may be respectively modulated by controlling intake and exhaust variable cam phasing/variable lift control (VCP/VLC) devices 22 and 24. These two VCP/VLC devices 22, 24 are configured to control and operate an intake camshaft 21 and an exhaust camshaft 23, respectively. Rotation of these intake and exhaust camshafts 21 and 23 are linked and/or indexed to rotation of the crankshaft 11, thus linking openings and closings of the intake and exhaust valves 20, 18 to positions of the crankshaft 11 and the pistons 16. The intake VCP/VLC device 22 may be fabricated with a mechanism operative to switch and control valve lift of the intake valve(s) 20 in response to a control signal (iVLC) 125, and variably adjust and control phasing of the intake camshaft 21 for each cylinder 15 in response to a control signal (iVCP) 126. In the same vein, the exhaust VCP/VLC device 24 may include a mechanism operative to variably switch and control valve lift of the exhaust valve(s) 18 in response to a control signal (eVLC) 123, and variably adjust and control phasing of the exhaust camshaft 23 for each cylinder 15 in response to a control signal (eVCP) 124. The VCP/VLC devices 22, 24 may be actuated using any one of electro-hydraulic, hydraulic, electro-mechanic, and electric control force, in response to respective control signals eVLC 123, eVCP 124, iVLC 125, and iVCP 126.

With continuing reference to the representative configuration of FIG. 1, ICE assembly 12 employs a gasoline direct injection (GDI) fuel injection subsystem with multiple high-pressure fuel injectors 28 that directly inject pulses of fuel into the combustion chambers 17. Each cylinder 15 is provided with one or more fuel injectors 28, which activate in response to an injector pulse width command (INJ_PW) 112 from the ECU 5. These fuel injectors 28 are supplied with pressurized fuel by a fuel distribution system. One or more or all of the fuel injectors 28 may be operable, when activated, to inject multiple fuel pulses (e.g., a succession of first, second, third, etc., injections of fuel mass) per working cycle into a corresponding one of the ICE assembly cylinders 15. The ICE assembly 12 employs a spark-ignition subsystem by which fuel-combustion-initiating energy—typically in the nature of an abrupt electrical discharge—is provided via a spark plug 26 for igniting, or assisting in igniting, cylinder charges in each of the combustion chambers 17 in response to a spark command (IGN) 118 from the ECU 5. Aspects of the present disclosure may be similarly applied to compression-ignited (CI) diesel engines.

The ICE assembly 12 is equipped with various sensing devices for monitoring engine operation, including a crank sensor 42 having an output indicative of crankshaft rotational position, e.g., crank angle and/or speed (RPM) signal 43. A temperature sensor 44 is configured to monitor, for example, one or more engine-related temperatures (e.g., coolant temperature, fuel temperature, exhaust temperature, etc.), and output a signal 45 indicative thereof. An in-cylinder combustion sensor 30 is configured to monitor combustion-related variables, such as in-cylinder combustion pressure, charge temperature, fuel mass, air-to-fuel ratio, etc., and output a signal 31 indicative thereof. An exhaust gas sensor 40 is configured to monitor an exhaust-gas related variables, e.g., actual air/fuel ratio (AFR), burned gas fraction, etc., and output a signal 41 indicative thereof. The combustion pressure and the crankshaft speed may be monitored by the ECU 5, for example, to determine combustion timing, i.e., timing of combustion pressure relative to the crank angle of the crankshaft 11 for each cylinder 15 for each working combustion cycle. It should be appreciated that combustion timing may be determined by other methods. Combustion pressure may be monitored by the ECU 5 to determine an indicated mean effective pressure (IMEP) for each cylinder 15 for each working combustion cycle. The ICE assembly 12 and ECU 5 cooperatively monitor and determine states of IMEP for each of the engine cylinders 15 during each cylinder firing event. Alternatively, other sensing systems may be used to monitor states of other combustion parameters within the scope of the disclosure, e.g., ion-sense ignition systems, EGR fractions, and non-intrusive cylinder pressure sensors.

Control module, module, control, controller, control unit, processor and similar terms mean any one or various combinations of one or more of Application Specific Integrated Circuit(s) (ASIC), electronic circuit(s), central processing unit(s) (e.g., microprocessor(s)), and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The ECU may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

Figure 2:
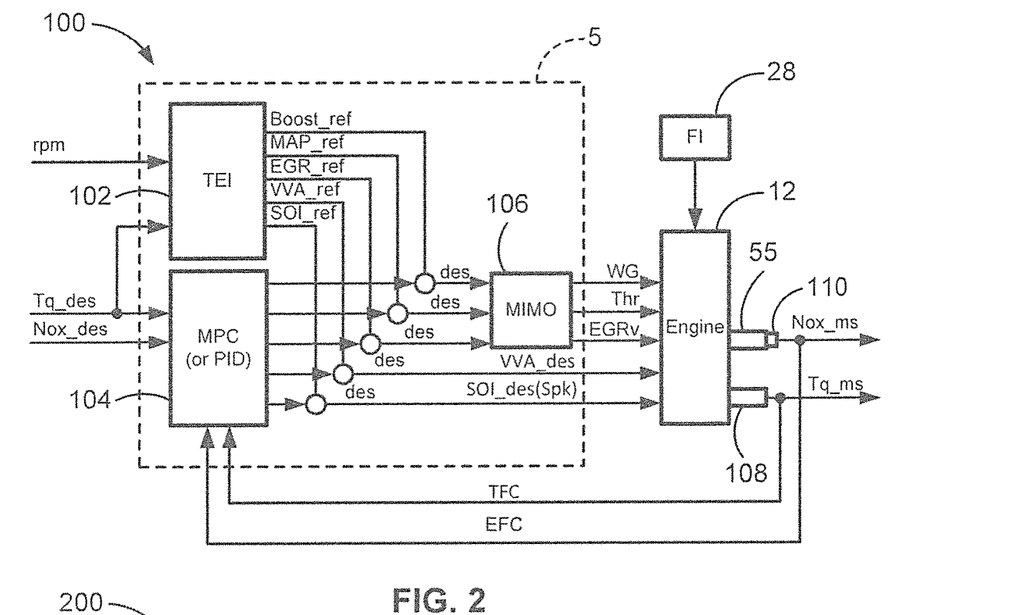
FIG. 2 is a schematic diagram of a representative multivariable engine torque and emission closed-loop control architecture in accordance with aspects of the present disclosure.

Presented in FIG. 2 is a representative multivariable engine torque and emission control (ETEC) architecture, designated generally as 100, that is operable, for example, to provide closed-loop-based fuel control to deliver optimal engine torque and closed-loop-based air and combustion control to minimize combustion-generated emissions. As will be described in further detail below, the ETEC architecture 100 can help to optimize combustion efficiency, and can help to provide fast torque response tracking while minimizing fuel consumption. ETEC architecture 100 can also help to provide real-time nitrogen oxide (NOx) feedback control to help ensure optimal integration of the combustion and aftertreatment systems to gain more fuel economy during aftertreatment NOx reduction, and can help to reduce air-charging system calibration. The closed-loop ETEC architecture 100 may employ additive and multiplicative engine torque models, as well as Model Predictive Control (MPC) of a multi-input and multi-output combustion system using turbocharger wastegate (WG), intake throttle valve (ITV), start of injection (spark timing) (SOI (Spk)), and cam phaser (CP) data with constraint fuel economy optimization.

In the illustrated example, portions of the ETEC architecture 100 are shown generally embodied as interoperable control modules—a Torque Emission Inverse (TEI) module 102, a Model Predictive Control (MPC) module 104, and a Multiple Input Multiple Output (MIMO) module 106—that may each comprise a respective software application with processor-executable instructions effectuated, for example, by the onboard engine control unit (ECU) 5 of motor vehicle 10 shown in FIG. 1. For at least some applications, the MPC module 104 can be replaced by or supplemented with a Proportional Integral Derivative (PID) module. In the same vein, it is envisioned that each control module may comprise a discrete controller, microprocessor or other integrated circuit (IC) device, all of which are operatively interconnected to carry out any of the functions and features disclosed herein. As a closed-loop system, the TEI, MPC and MIMO control modules 102, 104, 106, through implementation via the ECU 5, function to regulate operation of the ICE assembly 12 and exhaust aftertreatment system 55 based on feedback sensory data from the ICE and exhaust system (i.e., output quantities effect input quantities to the control process).

To provide closed-loop feedback data, ETEC system 100 may communicate with an assortment of onboard and off-board sensing devices, including those shown in FIG. 1 and described above, to aggregate relevant information for operation and optimization of the engine and exhaust system. In FIG. 2, the ECU 5 communicates with one or more engine sensors 108, which may be in the nature of a magnetoelastic, rotary transformer-type, or surface acoustic wave (SAW) torque sensor mounted on the crankshaft 11 or other appropriate component of the ICE assembly 12. The engine sensor(s) 108 are operable to monitor, e.g., in real-time, systematically/randomly track, or otherwise selectively detect current engine torque (Tq) of the ICE assembly, and transmit one or more signals indicative thereof. Alternative system architectures may eliminate or supplement engine sensor 108 data by utilizing, for example, a stored mathematical model to estimate engine torque. For aftertreatment system control, ECU 5 communicates with one or more exhaust sensors 110, which may be in the nature of a solid-state electrochemical or amperometric NOx sensor, such as a high-temperature ceramic metal oxide NOx sensor with a sensitivity ranging from about 100-2000 parts per million (ppm), mounted to a selective catalytic reduction (SCR) device of the exhaust aftertreatment system 55. The exhaust sensor(s) 110 is operable to monitor, e.g., in real-time, systematically/randomly track, or otherwise selectively detect current NOx engine output, and transmit one or more signals indicative thereof.

Model Predictive Control (MPC) module 104, which is shown in FIG. 2 communicatively connected to the ICE assembly 12, exhaust aftertreatment system 55, and engine and exhaust sensors 108, 110, receives operator inputs, closed-loop feedback data, and predetermined system parameters to carry out control-oriented modeling of the internal combustion engine. By way of example, and not limitation, MPC module 104 receives signals indicative of a desired engine torque (Tq_des) and a desired NOx output (NOx_des), as well as torque feedback control (TFC) signals and emission feedback control (EFC) signals indicative of current engine torque (Tq_ms) and current NOx output (NOx_ms), respectively. Desired engine torque (Tq_des) may come in the form of an operator torque request that is obtained, for example, through a throttle pedal sensor and/or a brake pedal sensor, among other possible devices. Conversely, desired NOx output (NOx_des) may be extracted from a stored lookup table that provides a predetermined parameter value for what is deemed an "acceptable level of NOx emission" for each of a variety of transient engine operating conditions (e.g., at different engine speeds, at different engine accelerations, etc.). This desired NOx output (NOx_des) can also be modified based on current operating conditions of an aftertreatment system.

Torque Emission Inverse (TEI) module 102 may be characterized as a feedforward block that stores or otherwise accesses one or more look-up tables and, based on engine speed (rpm) inputs and torque demand (Tq_des) inputs, generates air charging references for use by MIMO module 106 (e.g., and fuel injectors, cam phasers and/or variable valve actuators) to regulate operation of the ICE assembly 12 and SCR/EGR system 55. According to the example illustrated in FIG. 2, TEI module 102 receives an indication of current engine speed, e.g., via an inductive crankshaft position sensor, and accesses a stored lookup table to determine one or more charging references from the current engine speed (rpm) and desired engine torque (Tq_des). Non-limiting examples of air charging references generated by TEI 102 include: an engine boost pressure reference (Boost_ref), an engine intake manifold pressure reference (MAP_ref), an exhaust gas recirculation reference (EGR_ref), a variable value actuation reference (VVA_ref), and/or a start-of-injection reference (SOI_ref). In at least one special case, all the references generated by TEI block can also be set to zero. In at least some of the disclosed control algorithms, these references are used to establish the set points tracked by the air charging system and combustion system.

From the received operator inputs, feedback control data, air charging references, and desired parameters, such as current engine torque and NOx output, desired engine torque and NOx output, TEI reference values, etc., the MPC Module 104 calculates one or more desired engine operation references and one or more desired exhaust operation references for transmittal to the MIMO control module 106 or directly to the engine assembly 12. According to the illustrated example, the desired engine operation reference may comprise, singly or in any combination, a desired engine boost pressure reference (Boost_des), a desired engine intake manifold pressure reference (MAP_des), a desired variable valve actuation reference (VVA_des), and a desired start of injection reference (SOI_des). As another example, the desired exhaust operation reference may include a desired EGR reference (EGR_des). The manner by which these values can be determined will be explained in detail below.

Multiple Input Multiple Output (MIMO) control module 106 communicates, wired or wirelessly, with TEI module 102 and MPC module 104 to establish engine and emission control commands, e.g., one or more engine operation control commands and one or more exhaust operation control commands, from any appropriate combination of received inputs. The MIMO control 106 can regulate the combustion and aftertreatment systems, e.g., via a turbocharger wastegate (WG) command, an intake air throttle (Thr) command, a variable geometry turbine nozzle (VG) command, a variable valve actuation (VVA) command, or an exhaust gas recirculation (EGR) valve command, or any combination thereof, e.g., to deliver actual boost pressure, EGR, manifold pressure, start of injection and VVA positions. Since this system is closed-loop controlled, engine torque response is faster and less aggressive so as to not waste fuel.

Continuing with the representative architecture illustrated in FIG. 2, the ETEC system 100 provides closed-loop torque and emission feedback control using, for example, model predictive control algorithms or multivariable PIDs. Closed-loop feedback control may track desired torque performance and track desired emission targets to help ensure more effective combustion for better fuel economy with improved driver experience. Based on desired torque and emissions, as well as measured torque and emissions, the MPC module can further modify the air charging and combustion references to desired references: $p_{b,des}$—engine boost pressure reference; $p_{i,des}$—engine intake manifold pressure reference; $\dot{m}_{egr,des}$—EGR reference; $VVA_{des}$—variable value actuation reference; $SOI_{des}$—start of injection reference. The air charging and combustion system control may then make the boost pressure, intake manifold pressure, EGR and SOI and variable valve actuator positions track these desired set points instead of reference points. This modification may be based on an optimization strategy using model predictive control in such a way that combustion is further optimized and torque and emissions track desired targets.

The MPC control algorithm may determine desired air charging and combustion set points as defined by finding an optimal control, U, i.e. the desired set points for air charging and combustion, where $$U = [p_{i,des}, \dot{m}_{egr,des}, SOI_{des}, VVA_{des}]$$

where $p_{i,des}$ desired intake manifold pressure, des $\dot{m}_{egr,des}$ is a desired EGR mass air flow, $SOI_{des}$ is a desired start of injection timing, $VVA_{des}$ is a desired variable valve actuator position. U can be set to minimize torque and NOx tracking error defined by the following cost function $$J = \int R_1(T_{q,des}-T_q)^2 + R_2(NO_{x,des}-NO_x)^2 + \ldots + S_1(p_{i,ref}-p_{i,des})^2 + S_2(\dot{m}_{egr,ref}-\dot{m}_{egr,des})^2 + S_3(SOI_{ref}-SOI_{des})^2 + S_4(VVA_{ref}-VVA_{des})^2$$

where $p_{i,ref}$ is an intake manifold pressure reference, $\dot{m}_{egr,red}$ is an EGR mass air flow reference, $SOI_{ref}$ is a start of injection reference, $VVA_{ref}$ is a variable valve actuator position reference, $NO_x$, is a current engine out NOx measurement, $NO_{x,des}$ is a desired engine out $NO_x$, R1, R2, S1, S2, S3 and S4 are each a respective weight for the cost function J, $T_q$ is a current engine torque measurement, and $T_{q,des}$ is a desired engine torque. Cost function J may then be subject to engine system constraints $dT_q/dt$ and $dNO_x/dt$ where $$\frac{dT_q}{dt} = f(T_q, p_i, \dot{m}_a, p_x, SOI, VVA, \dot{m}_f, rpm)$$

$$\frac{dNO_x}{dt} = f(NO_x, \dot{m}_{egr}, \dot{m}_a, SOI, \dot{m}_f, T_i, T_{coolant}, RH\%, p_{rail}, VVA)$$

where $p_i$ is a current intake manifold pressure, $p_x$ is a current exhaust pressure, $p_{rail}$ is a current rail pressure (e.g., of a high-pressure common rail fuel injection system), $\dot{m}_a$ is a current fresh mass air flow, $\dot{m}_f$ is a current fuel mass flow, SOI is a current start of injection, VVA is a current variable valve actuator position, rpm is a current engine speed, $T_i$ is a current engine temperature, RH is a current relative humidity, and $T_{coolant}$ is a current coolant temperature. Additional constraints during the optimization may include fuel economy $bsfc$ : $\dot{m}_f < \alpha \cdot T_q \cdot rpm$ smoke limit $\phi = \dfrac{\dot{m}_f}{\dot{m}_a} < \beta$ and $\|\Delta U\| = \|U_{ref} - U_{des}\| < U_{max}$ The last constraint may require the control vector $U_{des}$ not deviate far away from $U_{ref}$ generated from feedforward control. For at least some embodiments, this algorithm can be performed in discrete state space. By solving this optimal control problem, the control vector will become the function of both desired and measured engine torque and engine out NOx.

$U_{des} = [p_{i,des}, \dot{m}_{egr,des}, SOI_{des}, VVA_{des}] = f(T_{q,des}, NO_{x,des}, T_q, NOx)$ Any nonlinear optimization algorithms can be applied to solve this MPC problem to find the optimum control U, such as using extreme seeking algorithm, Newton Generalized Minimum Residual Method. MPC problem can also be solved by using linear parameter varying MPC algorithm, etc.

Figure 3:
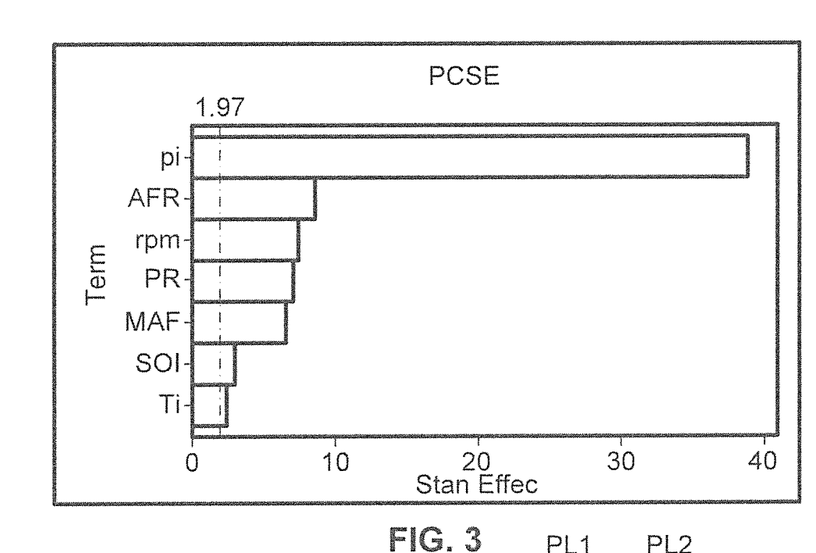
FIG. 3 is a Pareto Chart illustrating examples of the Standardized Effects (engine torque response) for the representative engine torque and emission feedback control architecture of FIG. 2.

FIG. 3 is a Pareto Chart illustrating examples of some Standardized Effects (labelled "PCSE" in the drawings) for the representative engine torque and emission feedback control architecture of FIG. 2. Based on experimental and statistical analysis, it is found that engine torque generation oftentimes depends, for example, on intake manifold pressure (pi), air/fuel ratio (AFR), engine speed (rpm), PR (engine delta pressure px/pi, sometimes defined as difference $\Delta p = px-pi$), mass airflow (MAF), start of injection (SOI), and engine (intake manifold) temperature (Ti). By analyzing the sensitivity of engine torque with respect to various parameters, e.g., based on rich experimental data using statistical analysis, with a confidence level of 95% (Alpha=0.05), it was determined that a parameter that falls below 1.97 of the standard effect may be considered "noise." Conversely, the higher the standard effect of a parameter, the more impact it has on engine torque. From this representative plot, it was determined that intake manifold pressure pi contributes the most to engine torque, then AFR, RPM, engine delta pressure=Px/Pi, and then MAF (equivalent to EGR), SOI, etc. Using regression, a linear parameter varying engine torque model can be built:

additive model $$T_{qs} = a_1(t) + Q_{LH}\dot{m}_f / rpm + (a_2(t) + a_3(t) \cdot rpm)p_i +$$
$$a_4(t)\dot{m}_a + a_5(t)SOI + a_6(t)\Delta p + a_7(t)EMOP + a_8(t)IMOP$$

multiplicative model $$T_{qs} = (Q_{LH}\dot{m}_f / rpm)$$
$$(a_1(t)p_i + a_2(t)\dot{m}_a + a_3(t)T_{im} + a_4(t)SOI + a_5(t)EMOP + a_6(t)IMOP) +$$
$$a_7(t)\Delta p + a_8(t) \cdot rpm^2$$

$$\frac{dT_q}{dt} = AT_q + BT_{qs}$$

including an NOx LPV model $NO_x = a_1(t)\dot{m}_{egr} + a_2(t)AFR + a_3(t)SOI + f(\dot{m}_f, T_{im}, T_{coolant}, RH\%, p_{rail}) + y_d$ $\dot{x}_2 = F_{2 \times 2}x_2 + Gu, y_d = Hx_2, u = (\dot{m}_{egr,des} - \dot{m}_{egr})$ where $Q_{LH}$ represents fuel energy low heating value, $T_{qs}$ is a regression torque, and $T_q$ is dynamic torque. As a non-limiting example, the physics meaning to model the engine torque is that Torque=(fuel energy)*(combustion efficiency)+Pumping torque+friction torque, in the multiplicative torque model:

fuel energy=$(Q_{LH}\dot{m}_f/rpm)$ combustion efficiency=$(a_1(t)p_i + a_2(t)\dot{m}_a + a_3(t)T_{im} + a_4(t)SOI + a_5(t)EMOP + a_6(t)IMOP)$ pumping torque=$a_7(t)\Delta p$ friction torque=$a_8(t) \cdot rpm^2$ Where IMOP stands for intake valve max open position, and EMOP stands for exhaust valve max open position. This is just one example of regression; there are different combinations of regression that may also be employed. The advantage of this regression model is that they are linear functions of the inputs; the "slow" time varying coefficients $a1(t), a2(t), \ldots a8(t)$ may be identified based on torque operating range. For example, in the FIG. 4, the torque operating range is shown partitioned into three ranges—low, middle and high torque ranges. In each range, those regression coefficients are constants.

Figure 4:
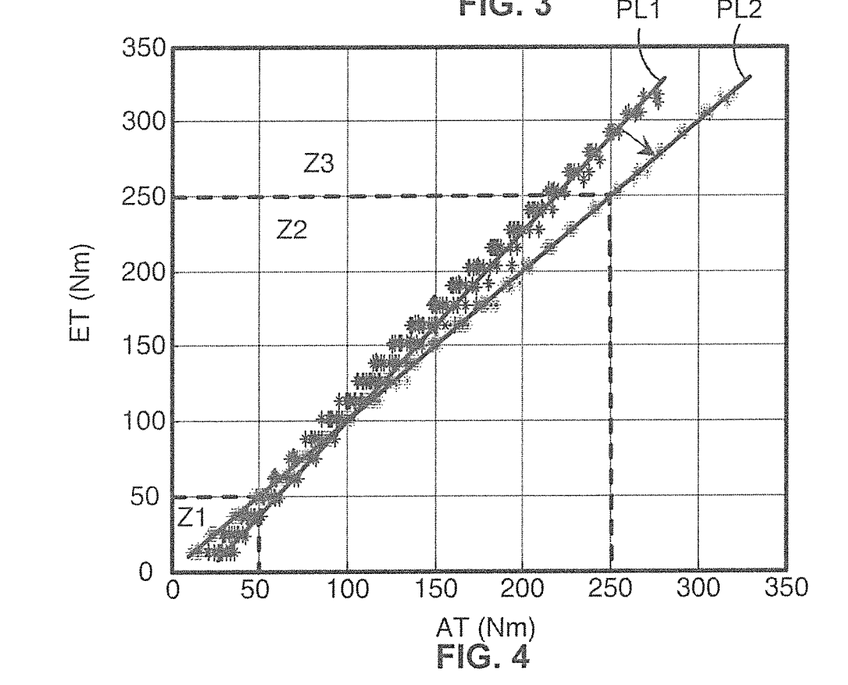
FIG. 4 is a chart illustrating a representative multi-zone torque regression model with actual torque (Nm) versus estimated torque (Nm) in accordance with aspects of the present disclosure.

FIG. 4 is a chart illustrating a representative multi-zone torque regression model with actual torque (AT) plotted against estimated torque (ET), both in Newton-meters (Nm), in accordance with the multiplicative regression model explicated above. In the illustrated example, Zone 1 (Z1) can be considered "low-range" torque, Zone 2 (Z2) can be considered "mid-range" torque, whereas Zone 3 (Z3) can be considered "high-range" torque. If there is a torque sensor or high fidelity torque estimate, the zones can be removed by using recursive least square algorithms to identify parameters a1 through a8 to identify the LPV torque model. This chart plots estimated torque—estimated from the multiplicative torque model—against actual measured torque; if the result is a diagonal line (as shown), then Torque_est=Torque actual. Plot line PL1 helps to validate the torque model with only one zone (e.g., all coefficients a1, a2, . . . a8 are constant no matter how large the torque become). Plot line PL2 helps to validate the torque model where it is composed of three submodels in each operating Zone Z1, Z2, Z3 wherein the torque coefficients remain constant in each Zone Z1, Z2, Z3. In this representative model, the three zones are Zone1 (e.g., 0 to 50 Nm), Zone2 (e.g., 50~250 Nm), and ZONE3 (e.g., 250 NM and above). This helps to show that model accuracy is improved with three zone torque model. In additional to this regression torque model, a different torque model can be employed where, in each operating zone, a state space torque model can be identified based on an input that affects indicated torque, u, and inputs that affect pumping torque and friction torque, d, where $$u = \begin{bmatrix} (Q_{LH}\dot{m}_f/rpm)p_i \\ (Q_{LH}\dot{m}_f/rpm)\dot{m}_{egr} \\ (Q_{LH}\dot{m}_f/rpm)SOI \\ (Q_{LH}\dot{m}_f/rpm)EMOP \\ (Q_{LH}\dot{m}_f/rpm)IMOP \end{bmatrix}$$

$$d = \begin{bmatrix} \Delta p \\ rpm^2 \end{bmatrix}$$

In this example, the transient torque model may use any system ID methods (e.g., MATLAB subspace ID n4sid), where $$\dot{x}_i = A_i x_i + B_i u + F_i d$$

$$T_q = C_i x_i + D_i u$$

where i=1, 2, 3 etc. Transient LPV torque model can be achieved by rearranging the state space model such that $$u = \begin{bmatrix} p_i \\ \dot{m}_{egr} \\ SOI \\ EMOP \\ IMOP \end{bmatrix}$$

$$d = \begin{bmatrix} \Delta p \\ rpm^2 \end{bmatrix}$$

And $$\dot{x}_i = A_i x_i + B(\rho)_i u + F_i d$$

$$T_q = C_i x_i + D(\rho)_i u$$

$$\rho = Q_{LH} \dot{m}_f / rpm$$

Figure 5:
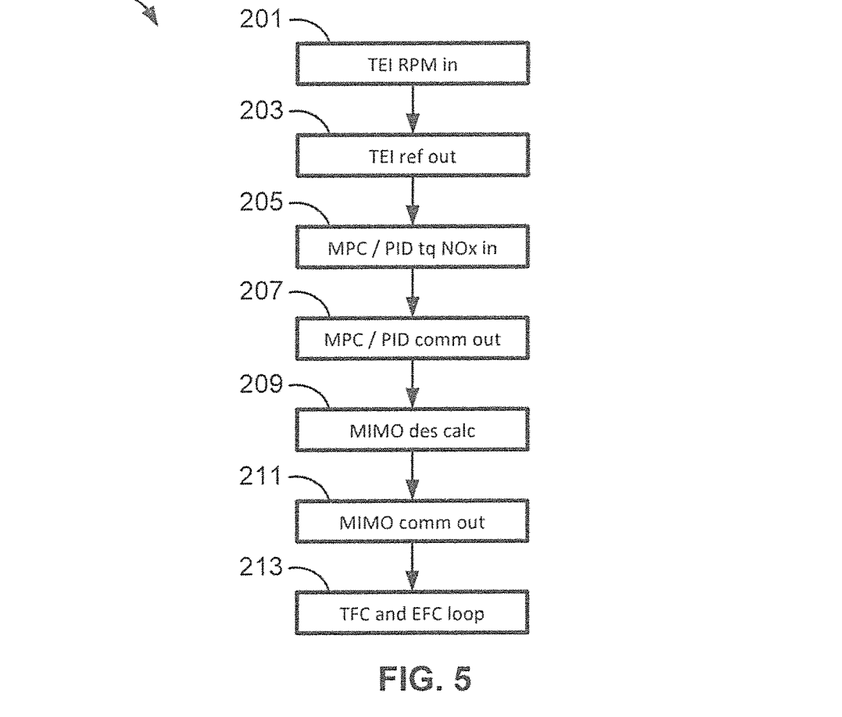
FIG. 5 is a flowchart for a multivariable engine torque and emission closed-loop control scheme or algorithm that may correspond to instructions executed by onboard control-logic circuitry or other computer-based device of a motor vehicle in accord with aspects of the disclosed concepts.

With reference now to the flow chart of FIG. 5, an improved method or control strategy for operating a multi-variable engine torque and emission closed-loop control system during operation of an internal combustion engine, such as ICE assembly 12 of FIG. 1, for a motor vehicle, such as the automobile 10, for example, is generally described at 200 in accordance with aspects of the present disclosure. FIG. 5 can be representative of an algorithm that corresponds to at least some instructions that can be stored, for example, in main or auxiliary memory, and executed, for example, by an ECU, CPU, an on-board or remote vehicle control logic circuit, or other device, to perform any or all of the above and/or below described functions associated with the disclosed concepts.

The method 200 of FIG. 5 starts at block 201 with receiving, e.g., via Torque Emission Inverse (TEI) module 102 of FIG. 2, one or more signals indicative of current engine speed (rpm). Block 201 may further comprise TEI module 102 receive one or more signals indicative of torque demand (Tq_des). At block 203, the method 200 includes communicating or otherwise outputting, e.g., via TEI module 102, one or more air charging references, such as those illustrated in FIG. 2 and described hereinabove. Method 200 of FIG. 5 continues to block 205 with receiving, e.g., via Model Predictive Control (MPC) module 104 of FIG. 2, one or more signals indicative of desired engine torque (Tq_des) and desired NOx output (NOx_des). Then, at block 207, the method 200 includes communicating or otherwise outputting, e.g., via MPC module 104, one or more desired engine operation and desired exhaust operation values.

With continuing reference to FIG. 5, method 200 continues to block 209 with calculating, e.g., via Multiple Input Multiple Output (MIMO) control module 106 of FIG. 2, one or more engine operation control commands and one or more exhaust operation control commands. These may include, singly and in any combination, the WG command, the Thr command, the VVA command, the EGR command, and the VG command. At block 211, the method 200 transmits or otherwise outputs these control commands to the engine and exhaust systems (e.g., ICE assembly 12 and exhaust aftertreatment 55 of FIG. 2). At block 213, TFC and EFC feedback control data is communicated to the ECU 5 for subsequent modification of MPC and MIMO control.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. An engine torque and emission control system for an internal combustion engine (ICE) assembly, the ICE assembly including one or more combustion chambers fluidly coupled to an exhaust aftertreatment system, the engine torque and emission control system comprising:
   an engine sensor configured to detect a current engine torque of the ICE assembly and output a signal indicative thereof;
   an exhaust sensor configured to detect a current nitrogen oxide (NOx) output of the ICE assembly and output a signal indicative thereof; and
   a programmable engine control unit communicatively connected to the engine sensor, the exhaust sensor, and the ICE assembly, the engine control unit being configured to:
      receive a signal indicative of a desired engine torque for the ICE assembly;
      determine a desired NOx output of the ICE assembly corresponding to the desired engine torque;
      determine, from the current engine torque detected by the engine sensor, the current NOx output detected by the exhaust sensor, the desired engine torque for the ICE assembly, and the desired NOx output for the desired engine torque, a desired engine operation reference and a desired exhaust operation reference;
      determine, from the desired engine operation reference and the desired exhaust operation reference, an engine operation control command and an exhaust operation control command; and
      output the engine operation and exhaust operation control commands to the ICE assembly.

2. The engine torque and emission control system of claim 1, wherein the engine control unit is further configured to:
   receive, from a crankshaft position sensor, a sensor signal indicative of a current engine speed of the ICE assembly; and
   determine an air charging reference from the current engine speed and the desired engine torque,
   wherein determining the engine operation control command or the exhaust operation control command, or both, is further based on the air charging reference.

3. The engine torque and emission control system of claim 2, wherein the air charging reference includes an engine boost pressure reference, an engine intake manifold pressure (MAP) reference, an exhaust gas recirculation (EGR) reference, a variable value actuation (VVA) reference, or a start-of-injection (SOI) reference, or any combination thereof.

4. The engine torque and emission control system of claim 1, wherein the desired engine operation reference includes a desired engine boost pressure reference, a desired engine intake manifold pressure (MAP) reference, a desired variable valve actuation (VVA) reference, or a desired start of injection (SOI) reference, or any combination thereof.

5. The engine torque and emission control system of claim 1, wherein the desired exhaust operation reference includes a desired exhaust gas recirculation (EGR) reference.

6. The engine torque and emission control system of claim 1, wherein the engine control unit includes a Model Predictive Control (MPC) module communicatively connected to the engine and exhaust sensors, the MPC module being configured to determine the desired engine operation reference and the desired exhaust operation reference and output signals indicative thereof.

7. The engine torque and emission control system of claim 6, wherein the engine control unit further includes a Multiple Input Multiple Output (MIMO) control module communicatively connected to the MPC module and configured to determine the engine operation and exhaust operation control commands.

8. The engine torque and emission control system of claim 7, wherein the engine control unit further includes a Torque Emission Inverse (TEI) module storing a lookup table and configured to determine an air charging reference from the lookup table based on a current engine speed and the desired engine torque.

9. The engine torque and emission control system of claim 1, wherein the engine control unit is further configured to determine an optimal control parameter U to minimize torque and NOx tracking error defined by a cost function J, where:

$$U = [p_{i,des} \ \dot{m}_{egr,des} \ SOI_{des}, VVA_{des}]$$

$$J = \min_U \int R_1(T_{q,des} - T_q)^2 + R_2(NO_{x,des} - No_x)^2 + \ldots + S_1(p_{i,ref} - p_{i,des})^2 + S_2(\dot{m}_{egr,ref} - \dot{m}_{egr,des})^2 + S_3(SOI_{ref} - SOI_{des})^2 + S_4(VVA_{ref} - VVA_{des})^2$$

and where $p_{i,des}$ is a desired intake manifold pressure, $\dot{m}_{egr,des}$ is a desired EGR mass air flow, $SOI_{des}$ is a desired start of injection, $VVA_{des}$ is a desired variable valve actuator position, $p_{i,ref}$ is an intake manifold pressure reference, $\dot{m}_{egr,red}$ is an EGR mass air flow reference, $SOI_{ref}$ is a start of injection reference, $VVA_{ref}$ is a variable valve actuator position reference, $NO_x$ is a current engine out NOx, $NO_{x,\ des}$ is a desired engine out NOx, R1, R2, S1, S2, S3 and S4 are each a respective weight for the cost function J, $T_q$ is a current engine torque, and $T_{q,\ des}$ is a desired engine torque.

10. The engine torque and emission control system of claim 9, wherein the cost function J is subject to engine system constraints $dT_q/dt$ and $dNO_x/dt$ where $$\frac{dT_q}{dt} = f(T_q, p_i, \dot{m}_a, p_x, SOI, VVA, \dot{m}_f, rpm)$$

$$\frac{dNO_x}{dt} = f(NO_x, \dot{m}_{egr}, \dot{m}_a, SOI, \dot{m}_f, T_i, T_{coolant}, RH\ \%, p_{rail}, VVA)$$

where $p_i$ is a current intake manifold pressure, $p_x$ is a current exhaust pressure, $g_{rail}$ is a current fuel rail pressure, $\dot{m}_a$ is a current fresh mass air flow, $\dot{m}_f$ is a current fuel mass air flow, SOI is a current start of injection, VVA is a current variable valve actuator position, rpm is a current engine speed, $T_i$ is a current engine temperature, RH is a current relative humidity, and $T_{coolant}$ is a current coolant temperature.

11. The engine torque and emission control system of claim 1, wherein the desired engine operation reference is determined from a linear parameter varying torque model or from a state space torque model.

12. The engine torque and emission control system of claim 1, wherein the engine operation command includes a turbocharger wastegate (WG) command, a throttle (Thr) command, a turbine nozzle command, or a variable valve actuation (VVA) command, or any combination thereof, and wherein the exhaust operation control command includes an exhaust gas recirculation (EGR) valve command.

13. The engine torque and emission control system of claim 1, wherein the engine sensor includes a torque sensor mounted on the ICE assembly, and the exhaust sensor includes an NOx sensor mounted to a selective catalytic reduction (SCR) device of the exhaust aftertreatment system.

14. A motor vehicle, comprising:
a vehicle body defining an engine compartment;
an internal combustion engine (ICE) assembly stowed in the engine compartment, the ICE assembly including an engine block with a plurality of cylinders bores, and a plurality of pistons each reciprocally movable within a respective one of the cylinder bores;
an exhaust gar recirculation (EGR) system fluidly coupled to the ICE assembly and configured to recirculate exhaust gases from the ICE assembly back into the cylinder bores;
an engine sensor configured to detect, in real-time, a current engine torque of the ICE assembly and output a signal indicative thereof;
a exhaust sensor configured to detect, in real-time, a current NOx output of the ICE assembly and output a signal indicative thereof; and
an engine control unit communicatively connected to the ICE assembly, the exhaust sensor, and the engine sensor, the engine control unit being programmed to:
receive a signal indicative of a desired engine torque for the ICE assembly;
determine a desired NOx output of the ICE assembly corresponding to the desired engine torque;
determine, from the current engine torque detected by the engine sensor, the current NOx output detected by the exhaust sensor, the desired engine torque for the ICE assembly, and the desired NOx output for the desired engine torque, a desired engine operation reference and a desired exhaust operation reference;
determine, from the desired engine operation reference and the desired exhaust operation reference, an engine operation control command and an exhaust operation control command; and
regulate operation of the ICE assembly and EGR system based on the engine operation and exhaust operation control commands.

15. A method of operating an engine torque and emission control system for an internal combustion engine (ICE) assembly, the ICE assembly including a plurality of combustion chambers fluidly coupled to an exhaust aftertreatment system, the method comprising:
receiving, via an engine control unit, a signal indicative of a desired engine torque for the ICE assembly;
determining, via the engine control unit, a desired NOx output of the ICE assembly corresponding to the desired engine torque;
receiving, via the engine control unit from an engine sensor, a sensor signal indicative of a current engine torque of the ICE assembly;
receiving, via the engine control unit from an exhaust sensor, a sensor signal indicative of a current NOx output of the ICE assembly;
determining, from the current engine torque detected by the engine sensor, the current NOx output detected by the exhaust sensor, the desired engine torque for the ICE assembly, and the desired NOx output for the desired engine torque, a desired engine operation reference and a desired exhaust operation reference;
determining, from the desired engine operation reference and the desired exhaust operation reference, an engine operation control command to govern operation of the ICE assembly and an exhaust operation control command to govern operation of the exhaust aftertreatment system; and
transmitting, via the engine control unit, the engine operation control command and the exhaust operation control command to the ICE assembly.

16. The method of claim 15, further comprising:
receiving, via the engine control unit from a crankshaft position sensor, a sensor signal indicative of a current engine speed; and
determining an air charging reference from the current engine speed and the desired engine torque,
wherein determining the engine operation control command or the exhaust operation control command, or both, is further based on the air charging reference.

17. The method of claim 16, wherein the air charging reference includes an engine boost pressure reference, an engine intake manifold pressure reference, an exhaust gas recirculation (EGR) reference, a variable value actuation (VVA) reference, or a start-of-injection (SOI) reference, or any combination thereof.

18. The method of claim 15, wherein the desired engine operation reference includes a desired engine boost pressure reference, a desired engine intake manifold pressure reference, a desired variable valve actuation (VVA) reference, or a desired start of injection (SOI), or any combination thereof.

19. The method of claim 15, wherein the desired exhaust operation reference includes a desired EGR reference.

20. The method of claim 15, wherein the desired engine operation reference is determined from a linear parameter varying torque model or a state space torque model.

* * * * *